(12) United States Patent
Coker, III et al.

(10) Patent No.: US 12,136,825 B2
(45) Date of Patent: Nov. 5, 2024

(54) IN-FLIGHT CONTACT CHARGING SYSTEM

(71) Applicants: James Mitchell Coker, III, Purcellville, VA (US); Matthew Gene Clark, Arlington, VA (US); Jackson Karl Harwell, Denton, TX (US)

(72) Inventors: James Mitchell Coker, III, Purcellville, VA (US); Matthew Gene Clark, Arlington, VA (US); Jackson Karl Harwell, Denton, TX (US)

( * ) Notice: Subject to any disclaimer, the term of this patent is extended or adjusted under 35 U.S.C. 154(b) by 531 days.

(21) Appl. No.: 17/648,744

(22) Filed: Jan. 24, 2022

(65) Prior Publication Data

US 2023/0066667 A1     Mar. 2, 2023

Related U.S. Application Data

(60) Provisional application No. 63/260,715, filed on Aug. 30, 2021.

(51) Int. Cl.
    *B64U 50/34*     (2023.01)
    *H02J 50/10*     (2016.01)

(52) U.S. Cl.
    CPC .............. *H02J 50/10* (2016.02); *B64U 50/34* (2023.01); *H02J 2310/48* (2020.01)

(58) Field of Classification Search
    CPC ...... H02J 50/10; H02J 2310/48; B64U 50/34; Y02T 10/70; Y02T 10/7072; Y02T 90/14
    USPC ....................................................... 320/128
See application file for complete search history.

(56) References Cited

U.S. PATENT DOCUMENTS

| | | |
|---|---|---|
| 7,543,780 B1 | 6/2009 | Marshall et al. |
| 9,815,563 B2 | 11/2017 | Yates et al. |
| 9,868,526 B2 | 1/2018 | Yates |
| 9,878,787 B2 | 1/2018 | Chan et al. |
| 9,902,504 B2 | 2/2018 | Moore |
| 9,975,442 B2 | 5/2018 | Lee et al. |
| 10,099,561 B1 | 10/2018 | Ananthanarayanan et al. |
| 10,843,814 B2 | 11/2020 | Michalski et al. |
| 10,919,626 B2 | 2/2021 | Jaugilas |
| 11,011,924 B2 | 5/2021 | Syracuse et al. |
| 2011/0011924 A1 | 1/2011 | Spivey, Sr. et al. |
| 2015/0336677 A1 | 11/2015 | Smaoui et al. |
| 2017/0015414 A1 | 1/2017 | Chan et al. |
| 2019/0047701 A1 | 2/2019 | Winkle et al. |
| 2019/0100331 A1 | 4/2019 | Wright |
| 2020/0039373 A1 | 2/2020 | Cantrell et al. |

(Continued)

*Primary Examiner* — Paul Dinh
(74) *Attorney, Agent, or Firm* — Dunlap Bennett & Ludwig, PLLC; Anna L. Kinney (57) ABSTRACT

An in-flight contact charging system includes a charging contact, a power receiver, and a recharging controller connected to the charging contact. The charging contact is mounted on a support. The power receiver is mounted on an aerial vehicle containing an electrical load. The power receiver connects to the electrical load. The recharging controller can detect contact between the charging contact and the power receiver; transmit electricity to the charging contact; detect a spike in battery impedance; and discontinue transmission of electricity to the charging contact. The system enables a drone to rapidly recharge its battery while in flight by making brief contact between the charging contact and the power receiver. This system keeps the drone airborne, does not waste energy, and is comparatively cheap to build and maintain.

11 Claims, 4 Drawing Sheets

(56) References Cited

U.S. PATENT DOCUMENTS

| | | |
|---|---|---|
| 2020/0189731 A1 | 6/2020 | Mistry et al. |
| 2021/0112723 A1 | 4/2021 | Maor |
| 2021/0114727 A1 | 4/2021 | Foster |
| 2023/0136273 A1* | 5/2023 | Wiegman ............... B64U 50/34 320/128 |

* cited by examiner

IN-FLIGHT CONTACT CHARGING SYSTEM

CROSS-REFERENCE TO RELATED APPLICATION

This application claims the benefit of priority of U.S. provisional application No. 63/260,715, filed Aug. 30, 2021, the contents of which are herein incorporated by reference.

BACKGROUND OF THE INVENTION

The present invention relates to contact power recharging of hovering vehicles and, more particularly, to methods and systems for transferring power by contact, during flight, to power-consuming unmanned aerial vehicles.

Unmanned aerial vehicles rely on battery power for uninterrupted operation. The flight times of these vehicles is severely limited by the capacity of onboard batteries. The demand for longer flight times is not only increasing but is a critical factor in maximizing utility of such vehicles for transportation of freight, delivery of parcels, personal airborne travel, search and rescue, disaster surveillance and other industrial or commercial applications.

All current drone charging solutions either require landing the drone or charging wirelessly with no contact, which is extremely expensive and wasteful. Such vehicles are typically charged by wired connection plugged into a power source or by low-efficiency wireless power transmission. Technology also exists for wirelessly charging devices by placing the devices to be charged on or in close proximity to inductive charging pads. Wireless charging by induction is highly inefficient and wasteful. Inductive charging pads require 30-45 minutes to charge. The length of time and the Federal Airline Administration (FAA) regulation for pre-flight checks make this impractical for long-range, large-scale drone logistical operations.

Technology also exists for charging vehicles in motion via contact, such as streetcars and trolleybuses. Ground vehicles of this type typically require continuous charging during operation, rather than intermittent rapid battery charging, as is proposed here.

Alternative charging methods either require the drone to land, subjecting it to FAA regulations that require a human presence at each landing site, or they are extremely expensive and wasteful of electrical energy. Hovering wireless systems must output 10 times more electrical energy than is needed to charge a drone, thus wasting a significant amount of power. Hovering wireless systems are also extremely expensive due to the complexity and rarity of components.

As can be seen, there is a need for an efficient means to recharge an airborne vehicle while it remains airborne.

SUMMARY OF THE INVENTION

The present invention provides a system that enables a drone to rapidly recharge its battery while in flight by hovering near the base station and making brief contact between the charging station and a lightweight charging receiver outfitted to the drone. This system keeps the drone airborne, charges rapidly, does not waste energy, and is comparatively cheap to build and maintain. This hover-and-go concept may extend flight times and range and avoid FAA regulations that require pre-flight checks after any landing.

In-flight contact charging enables the drone to stay airborne while charging, with a small contact point that may be attached to the drone without significantly affecting its payload capacity. Additionally, this system transfers its output power directly to the drone, ameliorating energy waste and lowering the overall environmental impact. Lastly, this system uses mostly electrical components well known in the art and is much less costly than hovering wireless methods.

In one aspect of the present invention, an in-flight contact charging system is provided, comprising: at least one charging contact mounted on a support; at least one power receiver mounted on an aerial vehicle containing an electrical load, wherein the power receiver electrically communicates with the electrical load; and a recharging controller electrically coupled to the at least one charging contact, said recharging controller being operative: to detect contact between the at least one charging contact and the at least one power receiver; in response to detecting the contact, to transmit electricity to the at least one charging contact; to detect a spike in battery impedance; and in response to detecting the spike, to discontinue transmission of electricity to the at least one charging contact.

In another aspect of the present invention, an in-flight contact charging method is provided, comprising: placing a charging contact on a support structure; mounting a power receiver on an aerial vehicle; flying said aerial vehicle in proximity to the charging contact; hovering said aerial vehicle in a position that makes contact between the charging contact and the power receiver; detecting the contact between the charging contact and the power receiver; transmitting electricity to the charging contact; detecting a spike in battery impedance; and discontinuing transmission of electricity to the at least one charging contact.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an in-flight contact charging system including at least one charging contact, a recharging controller and one or more power receivers. The contact charging system may include a pedestal/tower or a mounted support assembly, i.e., a mounting attached to a vertical surface.

The in-flight contact charging system may include, but is not limited to, a charging contact configured as a rod, hook, or plate. The charging contact may be shaped in any suitable configuration, with part or the entire conductor being unshielded for producing a charging current. The charging contact may produce one or more power transfer contacts. The charging contact has dimensions that accommodate power receiver contacts at various points on its surface area. The charging contact is preferably solid, although it may be made flexible. In an example, the charging contact may be placed along a wall or ceiling, on a floor, or on any other suitable support structure. The charging contact may be configured to deliver a direct current charge of variable amperage.

In an example, the charging contact is a rod 1 meter in length. The rod is an electrical conductor of a suitable length and arc for the particular application. The rod may be a stranded or non-stranded conductor. A stranded conductor may be made of a plurality of wires stranded together. The number of strands may vary from 2 to 10,000 strands, with the number and size of strands being selected for each particular application. In an example, the plurality of wires is in a range of 2 to 100 individual strands.

In an embodiment in which the charging contact is a plate, it is an electrical conductor of suitable size and shape for the particular application. The plate may be flat or curved. A flat conductor may be made of a plurality of electrically conductive layers joined together. The number of layers may vary from 2 to 100 layers, with the number and size of layers being selected for each particular application. In an example, the plurality of layers is in a range of 2 to 10 individual layers. A charging contact in plate configuration may be modified for inductive charging, so long as the drone also has an inductive charging receiver plate.

In an embodiment in which the charging contact is a hook, it is an electrical conductor of a suitable length and arc for the particular application. The hook may be a stranded or non-stranded conductor. A stranded conductor may be made of a plurality of wires stranded together. The number of electrically conductive strands may vary from 2 to 10,000 strands, with the number and size of strands being selected for each particular application. In an example, the plurality of wires is in a range of 2 to 100 individual strands.

The recharging controller determines if a drone is in contact with the charging contact and, in response, delivers a predetermined voltage and current to that contact. If no drone is present, then the contact remains idle, and does not conduct a current for safety and energy conservation. The recharging controller and charging circuits determine when internal battery impedance has spiked and, in response, discontinue charging to prevent overheating of the battery. The recharging controller may be operationally configured to relay a direct current continuous charge through the charging contact assembly with varying current amperages from a power source. In an example, the recharging controller relays current with an amperage of 50 to 150 amperes. In another example, the recharging controller relays current with an amperage of 10 to 50 amperes. In yet another example, the recharging controller relays current with an amperage of 150 to 250 amperes. The recharging controller may be physically integrated into the mounting support structure to create a unitary component that performs both functions. The recharging controller may be operatively coupled to the base of a pedestal support assembly.

The charging contact may produce a current charge by conducting current from the recharging controller which derives from a power source well known in the art. The charging current may be produced for transferring power (or transmitting electricity) by contact to a power receiver when the power receiver is in physical contact with the charging contact. The in-flight contact charging system may include a plurality of charging contact rods that each produces a respective current charge and are supported in variable configurations by the pedestal or mounted support assembly.

In an example, the power source is an alternating current (AC) or direct current (DC) power source having a pre-determined voltage and a pre-determined frequency. Examples of commercially available voltages and frequencies include 110 volts at 50 hertz, 110 volts at 100 hertz, 220 volts at 50 hertz, 110 volts at 60 hertz, 120 volts at 60 hertz, or 230 volts at 50 hertz. The power source may be a three-phase power source. For example, the recharging controller may simply be plugged into a 110 volt or 220 volt power source, if available. In another example, the power source is a DC power source. The DC power source supplies direct current to the recharging controller. An AC or DC power source may be provided by a generator, a renewable energy source, such as a solar, wind or hydro source, or other available power source. Different amperages may facilitate the use of receiver structures having dimensions corresponding to the drones' receiver in-flight contact charging needs.

Any electrical device outfitted with a suitable power receiver may receive power from the in-flight contact charger. This may include ground vehicles, personal devices, instruments, or other electromechanical devices.

The one or more power receivers may be electrically connected to one or more respective loads. In an embodiment, the power receiver is configured to be externally connected to the load. The load may be an electrical load of a user drone, such as a battery to be charged and/or operating electrical circuits. The charging circuits may also be configured to direct electrical power solely to the drone or solely to the batteries. Each of the one or more power receivers mounted on a drone and connected to a load may include a contact receiver assembly and charging circuits.

The contact receiver assembly may include at least one receiver charging contact. A receiver charging contact is a conductor that receives power from the mounted charging contact. Each receiver charging contact of the at least one contact receiver assembly may receive a continuous current charge from the charging contact assembly. In an example, the charging contact may be electrically connected with one or more power receivers for purposes alternative to transfer of power. The contact charging receiver may have dimensions of comparable size or smaller than corresponding dimensions of the in-flight charging contact system. In an example, the contact charging receiver has a largest dimension of about 1 to 20 centimeters in length and about 10 to 100 millimeters in girth. The charging circuits may convert the current charge and voltage to a current charge and voltage suitable for the respective one or more loads. The charging circuits may be housed in a housing separate from the load device or may be part of the load device. When separate, the charging circuits may include a housing conforming to a cover of the device associated with the load. In some embodiments, the drone may have onboard charging circuits and a receiver may be added.

The charging contact may be operatively coupled to the pedestal support assembly at variable heights from the ground determined for safety. In an example, the pedestal tower is between about 2 and 10 meters in height, and the pedestal arms that support the charging contact or contacts is between about 2 and 3 meters in length.

In an example, the mounted arms that support the charging contact are between about 2 and 3 meters in length.

Multiple in-flight contact chargers may be deployed to produce a network of recharging stations enabling commercial users to recharge drones in-flight wherever the network is available. This recharging network access may be a valuable product for business applications.

The in-flight contact charging system enables transfer of electrical power to one or more devices in real time. The in-flight contact charging system may facilitate in-flight contact charging to one user drone or a plurality of user drones may be in simultaneous or serial contact.

The in-flight contact charging system may be implemented in an open or closed environment. For example, the in-flight contact charging system may be implemented outside a building such as an open field, on top of a tower, on a rooftop, or mounted to the side of a structure. In another example, the in-flight contact charging system may enable transferring power inside a closed environment, such as a warehouse. The transfer of power is based on expected power delivery capabilities of the systems and is not dependent upon characteristics of the open or closed environments. In an example, the in-flight contact charging system may provide power to a drone, such as an unmanned aerial vehicle (UAV), in the open environment at a power level of more than 500 watts.

A user may fly their drone to the charging station, make contact between the charging contact and power receiver, and rapidly recharge their battery. Once recharged, the user may resume flight without having to perform pre-flight checks. For example, a drone delivery user may launch a drone carrying a package from his loading warehouse with a delivery target that is 50% farther than the maximum range consistent with the battery life of the user's drone. Rather than fly to the delivery target, the user may pilot the drone to the in-flight contact charger, which is near the middle of his range, hover and recharge, then continue to the delivery target. Once delivery is made, the user may pilot back to the in-flight contact charger, recharge again, and then return to the warehouse. This effectively increased his delivery range by 50% without a significant increase in delivery time. At scale, a user may fly to multiple in-flight contact chargers at increasing ranges, thus effectively making his delivery range indefinite.

"Rapid charge" refers to a charging time of from about 4 to about 8 minutes, depending upon the maximum charge (C) rating of the battery, e.g., 10 C, and the amount of charge remaining when recharging begins. Recharge time may be optimized by changing the charge amperage delivered to the battery from the charger, with lower ratings requiring lower amperage and longer recharge times.

Six examples of in-flight contact charging assemblies are discussed below. In each example, the charging contact may be configured to deliver a direct current charge of variable amperage. Each of the one or more power receivers may include a contact receiver assembly and charging circuits. The charging contact may produce a current charge by conducting current from the recharging controller which derives from a power source well known in the art. The charging current may be produced for transferring power by contact to a power receiver when the power receiver is in physical contact with the charging contact.

In the first example, the in-flight contact charging assembly may include a charging contact configured as a rod, recharging controller and pedestal support assembly. The charging contact may be operatively coupled to the pedestal support assembly at variable heights from the ground determined for safety. The recharging controller may be operatively coupled to the base of the pedestal support assembly. The in-flight contact charging assembly may include a plurality of charging contact rods that each produces a respective current charge and are supported in variable configurations by the pedestal support assembly.

In the second example, the in-flight contact charging assembly may include a charging contact configured as a rod, a recharging controller and a mounted support assembly. The charging contact may be operatively coupled to the mounted support assembly. The recharging controller may be operatively coupled to the base of the mounted support assembly. The in-flight contact charging assembly may include one or more charging contact rods that each produces a respective current charge and are supported in variable configurations by attachment of the mounted support assembly onto a surface structure.

In the third example, the in-flight contact charging assembly may include a charging contact configured as a plate, a recharging controller and a pedestal support assembly. The charging contact may be operatively coupled to the pedestal support assembly. The recharging controller may be operatively coupled to the base of the pedestal support assembly. The in-flight contact charging assembly may include one or more charging contact plates that each produces a respective current charge and are supported in variable configurations by the pedestal support assembly.

In the fourth example, the in-flight contact charging assembly may include a charging contact configured as a plate, a recharging controller and a mounted support assembly. The charging contact may be operatively coupled to the mounted support assembly. The recharging controller may be operatively coupled to the base of the mounted support assembly. The in-flight contact charging assembly may include one or more charging contact plates that each produces a respective current charge and are supported in variable configurations by attachment of the mounted support assembly onto a surface structure.

In the fifth example, the in-flight contact charging assembly may include a charging contact configured as a hook, a recharging controller and a pedestal support assembly. The charging contact may be operatively coupled to the pedestal support assembly. The recharging controller may be operatively coupled to the base of the pedestal support assembly. The in-flight contact charging assembly may include a plurality of charging contact hooks that each produces a respective current charge and are supported in individual arrangement on a single pedestal support in an inverted hook configuration.

In the sixth example, the in-flight contact charging assembly may include a charging contact configured as a hook, a recharging controller and a mounted support assembly. The charging contact may be operatively coupled to the mounted support assembly. The recharging controller may be operatively coupled to the base of the mounted support assembly. The in-flight contact charging assembly may include a plurality of charging contact hooks that each produces a respective current charge and are supported in individual arrangement on a single mounted support in an inverted hook configuration.

Figure 1:
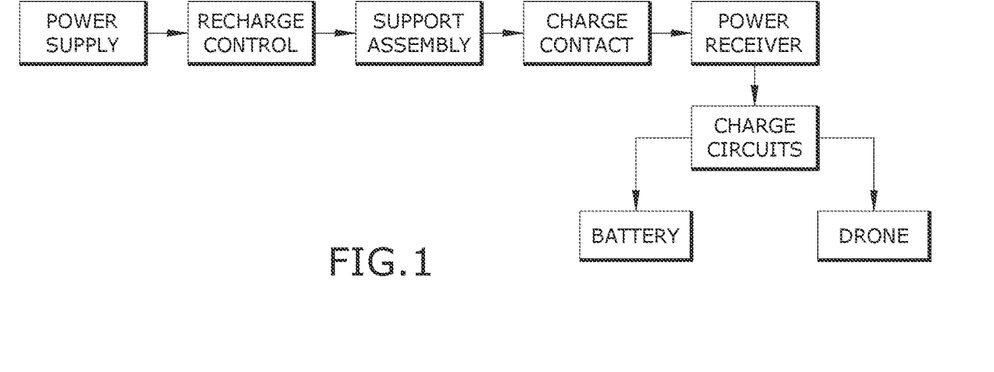
FIG. 1 is a block diagram of an in-flight contact charging system according to an embodiment of the present invention.

Referring to FIGS. 1 through 12, FIG. 1 is a block diagram illustrating the function of an in-flight contact charging assembly according to an embodiment of the present invention for in-flight contact charging. As shown in FIG. 1, a recharging controller 52 receives power from a power supply and directs that power to a charging contact 14, controlling for voltage and current. The charging contact 14 is a conductive rod, plate or hook (see FIGS. 9-11) that conveys power to a power receiver (see FIG. 4). The power receiver is a lightweight housing 28 mounted onto a drone 62 to receive power from the charging contact 14. The power receiver includes a charging receiver 34 and charging circuits 32. The charging contact 14 is supported by a support assembly, i.e., a pedestal or mounted support that holds the charging contact 14 at a proper elevation and distance from objects so that drones 62 may approach it without dangerous impacts. (See FIGS. 7 and 8). Charging circuits route power from the receiver charging contact 14 to the drone for maintaining flight operation while simultaneously recharging onboard batteries. (See FIG. 6.) In some examples, a drone 62 may be powered by a charging rod, plate or hook. The in-flight contact charging system may concurrently or sequentially power multiple drones 62.

Figures 2, 3:
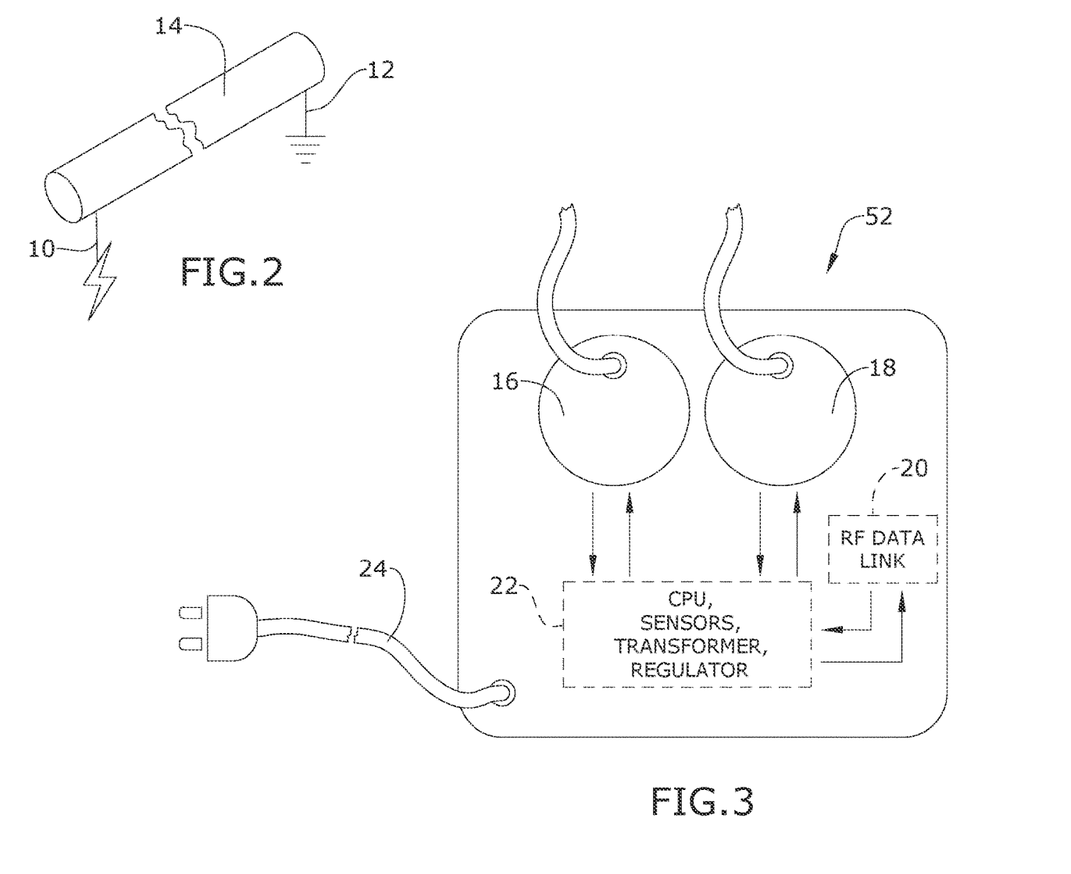
FIG. 2 is a schematic view of a contact charging system therefor.
FIG. 3 is a schematic view of a recharging controller therefor.

FIG. 2 illustrates an example of a charging contact 14. The charging contact 14 has a length and position suitable to provide a contact charging point and is electrically coupled to the recharging controller 52. The charging contact 14 may be supported in any suitable way in a building or in an open environment. The charging contact 14 has a power positive terminal 10 at a first end and a power ground terminal 12 at a second end.

FIG. 3 illustrates a recharging controller 52 according to an embodiment of the present invention. The recharging controller 52 delivers a current to the charging contact 14. The recharging controller 52 is configured to be connected to the power source to supply an electrical first power current. For example, the power source may be electrically connected to a receiving port of the recharging controller 52 by way of a cord 24. The recharging controller 52 is an electronic device that generates a direct current from the first power current. In some examples, the recharging controller 52 is a power and frequency adjustable recharging controller 52. The recharging controller 52 may be disposed at the pedestal support site or at any distance so long as it is electrically connected to the charging contact assembly. The recharging controller 52 is configured to be electrically connected to the charging contact 14. In addition, the charging contact may extend to a position disposed a predetermined distance from the recharging controller 52 such that the recharging controller 52 is not on the same surface as the charging contact or pedestal or mounted support. In an example, terminals of the charging contact are connected to corresponding ports of the recharging controller 52. The recharging controller 52 has a first contact output 16, a second contact output 18, a data link 20, circuitry 22, and a power cord 24.

Figure 4:
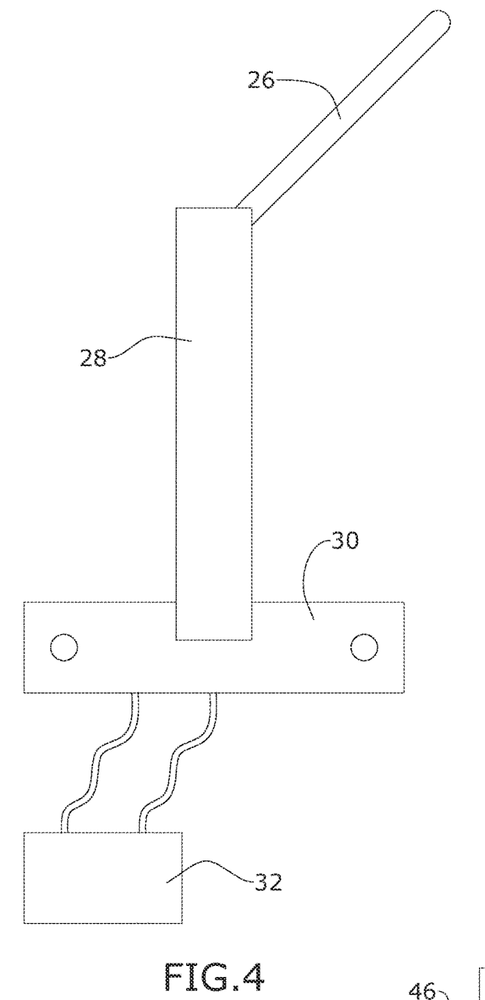
FIG. 4 is a schematic view of a power receiver therefor.

FIG. 4 illustrates a power receiver according to an embodiment of the present invention. When the power receiver is disposed in contact with a charging contact 14, the power receiver may draw power from the charging contact 14. In addition, the physical proximity of the contact 14 and the receiver induces a voltage on terminals of the receiver. The power receiver may include one or more components which enable reception of the current and delivery of the power to the load of each corresponding drone 62. As shown in FIG. 4, a conductor 26 may extend from a housing 28 attached to the drone 62 by way of an attachment plate 30 and may charge the drone by way of charging circuits 32. The in-flight contact charging system performs contact powering of the one or more drones 62 that may be placed at a predetermined distance from each other along the surface of the charging contact, as suitable for particular applications. The drones 62 receive power when the one or more power receivers attached to the drones 62 are in physical contact with a charging contact 14. Each power receiver is configured to be electrically connected to a corresponding drone 62. The power receiver is positioned above or below the drone 62 to maintain continuous physical contact between the contact charging receiver 34 and the charging contact 14. The charging contact 14 transmits electrical power for load when connected to a power receiver. When the load includes a rechargeable battery, the power transferred may be used to charge in real time the battery of one or more drones 62 having mounted power receivers or when connected to power receivers.

Figure 5:
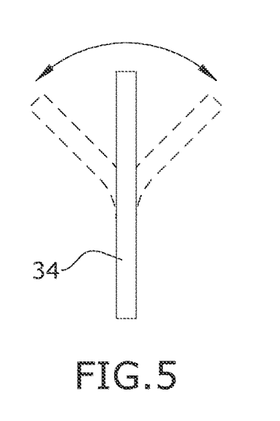
FIG. 5 is a schematic view of a contact charging receiver therefor.

FIG. 5 illustrates a flexible contact charging receiver 34. The in-flight contact charging system facilitates power transfer when the contact charging receiver 34 is positioned to be in physical contact with the charging contact 14. Further, as mentioned, the contact charging receiver 34 may be electrically coupled with one or more loads of a corresponding one or more drones 62. The battery of each drone 62 acts as the load. The load is electrically coupled with the power receiver. In addition, the load may be any drone 62 which uses electrical power to operate. In some examples, drones 62 may operate directly from power received from the in-flight contact charging system, with or without also charging a battery. The contact charging receiver 34 may be a wire or plate. The contact charging receiver 34 may have a pre-determined length that enables contact with the in-flight contact charging assembly without threat of contact with drone 62 propellors.

Figure 6:
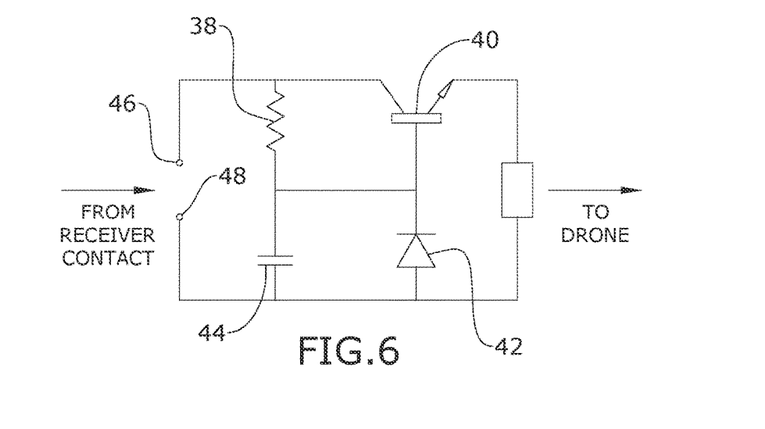
FIG. 6 is a schematic view of a charging circuit therefor.

FIG. 6 illustrates charging circuits comprising a resistor 38, a switch 40, a diode 42, a capacitor 44, a first contact 46, and a second contact 48. The charging circuits may receive electrical power from the contact charging receiver 34 and convert that current and voltage to levels required by the drone 62 to both receive electrical power to maintain flight and to simultaneously provide electrical power to onboard rechargeable batteries.

Figures 7, 8, 9, 10, 11:
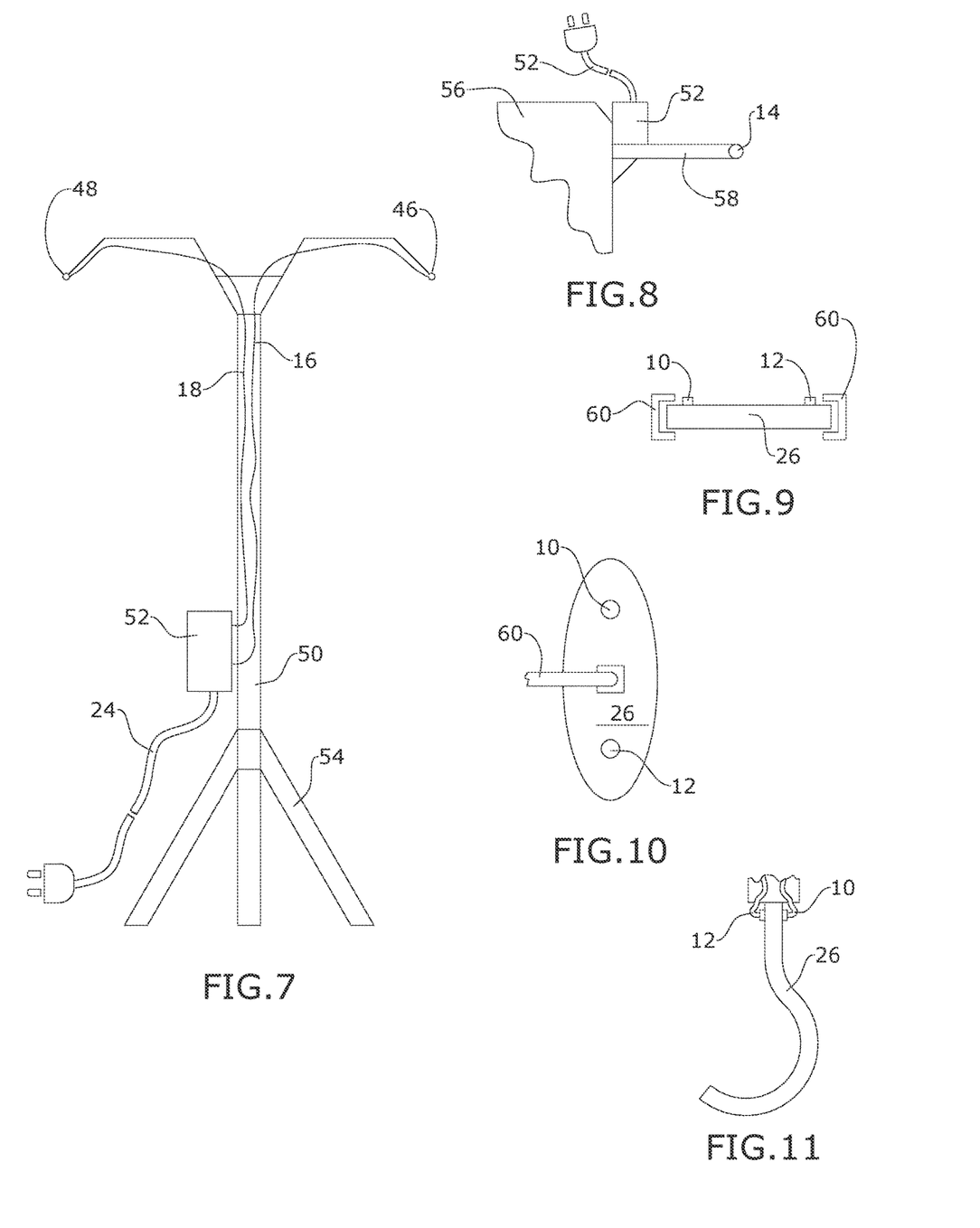
FIG. 7 is a front elevation view of a pedestal assembly therefor.
FIG. 8 is a front elevation view of a mounted assembly therefor.
FIG. 9 illustrates a contact charging receiver rod therefor.
FIG. 10 is a detail view of a contact charging receiver plate therefor.
FIG. 11 is a detail view of a contact charging receiver hook therefor.

FIGS. 7 and 8 show alternative embodiments of support assemblies according to the present invention.

FIG. 7 illustrates a pedestal supported configuration of an in-flight contact charging assembly, comprising a first contact 46, a second contact 48, a mast 50, a recharging controller 52, and a mast base 54. In some examples, the pedestal configuration is intended to support the charging contact at a variable elevation so that a drone 62 may fly close enough to establish physical contact between the charging contact and the power receiver. The pedestal configuration may place the charging contact at a distance from the central tower.

FIG. 8 is an illustration of a mounted support configuration of an in-flight charging assembly comprising a recharging controller 52 and a charging contact 14 supported by a mount 58 attached to a support structure 56. In some examples, the mounted configuration is intended to support the charging contact 14 at a variable lateral distance from the support structure 56 so that a drone 62 may fly close enough to establish physical contact between the charging contact 14 and the power receiver. The mounted configuration may place the charging contact 14 at a distance from the support structure 56.

FIGS. 9, 10, and 11 show charging contacts according to various embodiments of the present invention. FIG. 9 is an illustration of a conductor 26 configured as a charging rod comprising a power positive terminal 10, a power ground terminal 12, and a mounting bracket 60. FIG. 10 is an illustration of a conductor 26 configured as a charging plate comprising a power positive terminal 10, a power ground terminal 12, and a mounting bracket 60. FIG. 11 is an illustration of a conductor 26 configured as a charging hook comprising a power positive terminal 10 and a power ground terminal 12.

Figure 12:
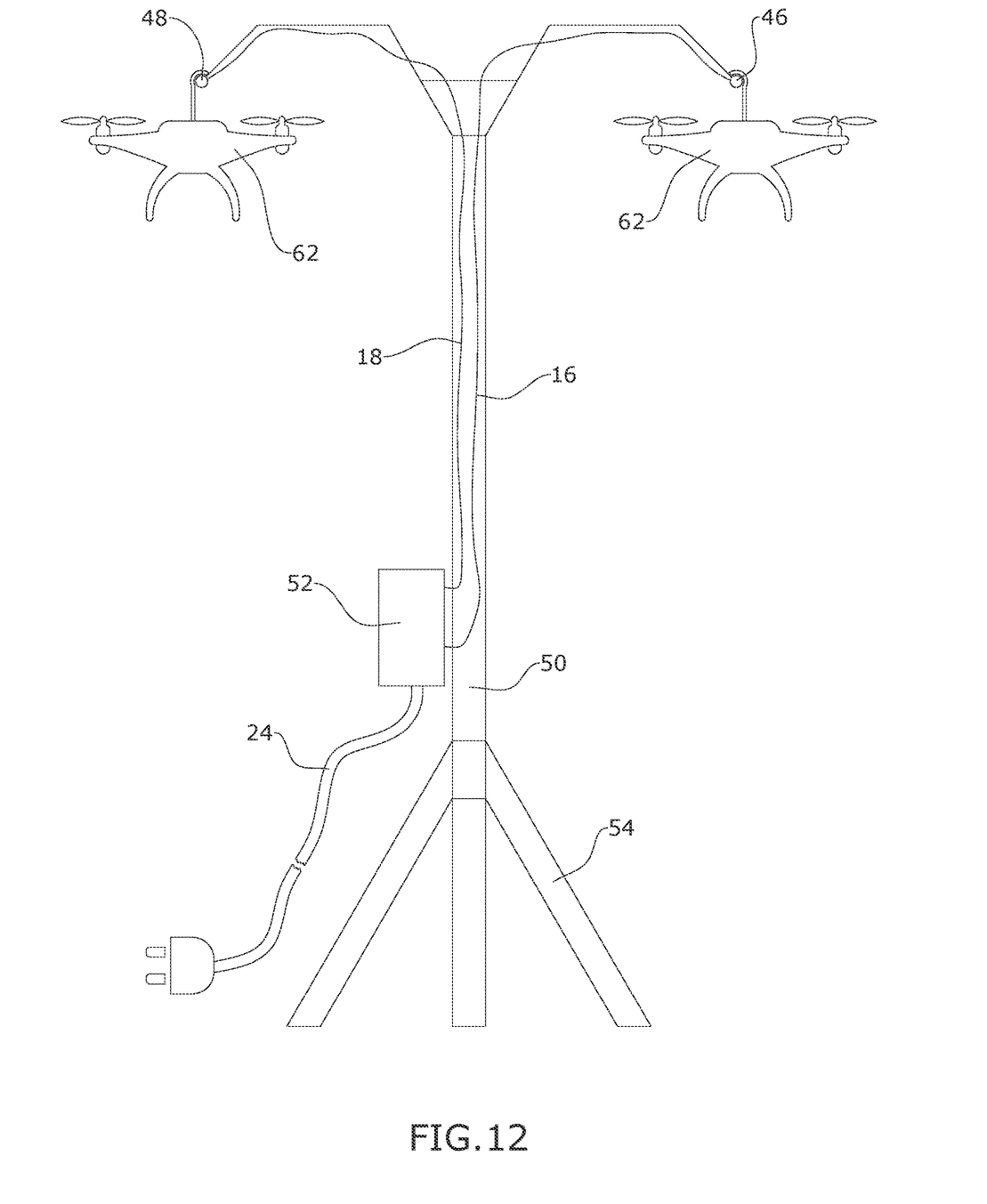
FIG. 12 is a front elevation view of the pedestal assembly of FIG. 7 and the contact charging receiver of FIG. 11, shown in use.

FIG. 12 illustrates an in-flight contact charging system in use recharging multiple power receivers. The in-flight contact charging system enables transferring of electrical power to one or more devices in real time. The in-flight contact charging system may facilitate in-flight contact charging to one user drone 62 or to a plurality of user drones 62 simultaneously or serially.

It should be understood, of course, that the foregoing relates to exemplary embodiments of the invention and that modifications may be made without departing from the spirit and scope of the invention as set forth in the following claims.

What is claimed is:

1. An in-flight contact charging assembly, comprising:
   at least one charging contact mounted on a support;
   at least one power receiver mounted on an aerial vehicle containing an electrical load, wherein the power receiver electrically communicates with the electrical load; and
   a recharging controller electrically coupled to the at least one charging contact, said recharging controller being operative: to detect contact between the at least one charging contact and the at least one power receiver; in response to detecting the contact, to transmit electricity to the at least one charging contact; to detect a spike in battery impedance; and in response to detecting the spike, to discontinue transmission of electricity to the at least one charging contact.

2. The in-flight contact charging assembly of claim 1, wherein said at least one charging contact is operative to deliver a direct current charge of variable amperage over a surface area thereof.

3. The in-flight contact charging assembly of claim 1, wherein the support is selected from the group consisting of: a pedestal; a tower; and a support assembly mounted to a vertical surface.

4. The in-flight contact charging assembly of claim 1, wherein the at least one charging contact is flexible.

5. The in-flight contact charging assembly of claim 1, wherein the recharging controller is operative to regulate voltage and current transmitted to the at least one charging contact.

6. The in-flight contact charging assembly of claim 1, wherein the power receiver is electrically coupled to an electrical load and the power receiver comprises a charging receiver, charging circuits electrically communicating with the charging receiver, and a housing containing the charging receiver and the charging circuits.

7. The in-flight contact charging assembly of claim 1, wherein the at least one charging contact has a configuration selected from the group consisting of: a rod, a hook, and a plate.

8. The in-flight contact charging assembly of claim 7, wherein the at least one charging contact is a plate comprising a plurality of electrically conductive layers.

9. The in-flight contact charging assembly of claim 7, wherein the at least one charging contact comprises a plurality of electrically conductive strands.

10. An in-flight contact charging method, comprising:
    a) placing a charging contact on a support structure;
    b) mounting a power receiver on an aerial vehicle;
    c) flying said aerial vehicle in proximity to the charging contact;
    d) hovering said aerial vehicle in a position that makes contact between the charging contact and the power receiver;
    e) detecting the contact between the charging contact and the power receiver;
    f) transmitting electricity to the charging contact;
    g) detecting a spike in battery impedance; and
    h) discontinuing transmission of electricity to the at least one charging contact.

11. The in-flight contact charging method of claim 10, wherein the aerial vehicle is one of a plurality of aerial vehicles, the charging contact is one of a plurality of charging contacts, and the plurality of aerial vehicles make simultaneous contact with the plurality of charging contacts.

* * * * *